United States Patent [19]

Au

[11] 4,346,062
[45] * Aug. 24, 1982

[54] CHLORINATION LEACHING WITH SULFUR EXTRACTION FOR RECOVERY OF ZINC VALUES

[75] Inventor: Robert W. Au, Mission Viejo, Calif.

[73] Assignee: Occidental Research Corporation, Irvine, Calif.

[*] Notice: The portion of the term of this patent subsequent to Jun. 3, 1997, has been disclaimed.

[21] Appl. No.: 234,128

[22] Filed: Feb. 13, 1981

Related U.S. Application Data

[60] Continuation-in-part of Ser. No. 224,996, Jan. 14, 1981, abandoned, which is a division of Ser. No. 32,662, Apr. 29, 1979, abandoned, which is a continuation-in-part of Ser. No. 905,127, May 12, 1978, abandoned.

[51] Int. Cl.³ .................. C25C 1/16; C22B 19/22; C01G 9/04; C01B 17/06
[52] U.S. Cl. .................... 423/109; 423/568; 75/104; 75/120
[58] Field of Search ............... 423/101, 103, 110, 109, 423/568; 75/104, 120

[56] References Cited

U.S. PATENT DOCUMENTS

| | | | |
|---|---|---|---|
| 1,838,857 | 12/1931 | Mitchell | 75/120 |
| 3,927,170 | 12/1975 | Dixon | 423/33 |
| 3,998,628 | 12/1976 | Gandon | 423/40 |
| 4,206,023 | 6/1980 | Au | 423/109 |

FOREIGN PATENT DOCUMENTS 965964  4/1975  Canada .................. 423/109

OTHER PUBLICATIONS

Haver, "Recovering Elemental Sulfur from Non-Ferrous Minerals, U.S. Bureau of Mines", R. I. 7474, (1971), pp. 1–18.

Primary Examiner—Brian E. Hearn
Attorney, Agent, or Firm—Barry A. Bisson

[57] ABSTRACT

A process is disclosed for recovering zinc from a material containing zinc sulfide. The zinc sulfide-containing material is chlorinated in an aqueous medium to form zinc chloride and elemental sulfur. A water-immiscible solvent (preferably inert) for the sulfur is added to the aqueous chlorinating solution during the chlorination process. The aqueous solution which contains zinc values is separated from the water-immiscible solvent containing sulfur. The zinc values can be recovered from the aqueous layer.

5 Claims, 2 Drawing Figures

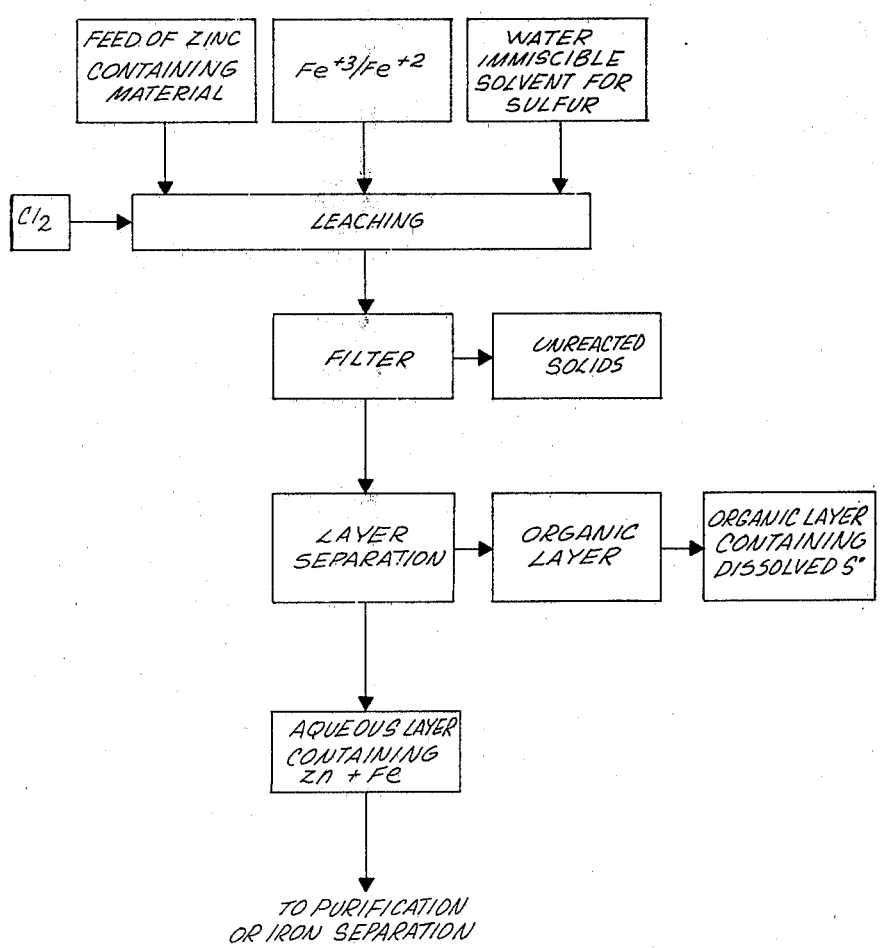

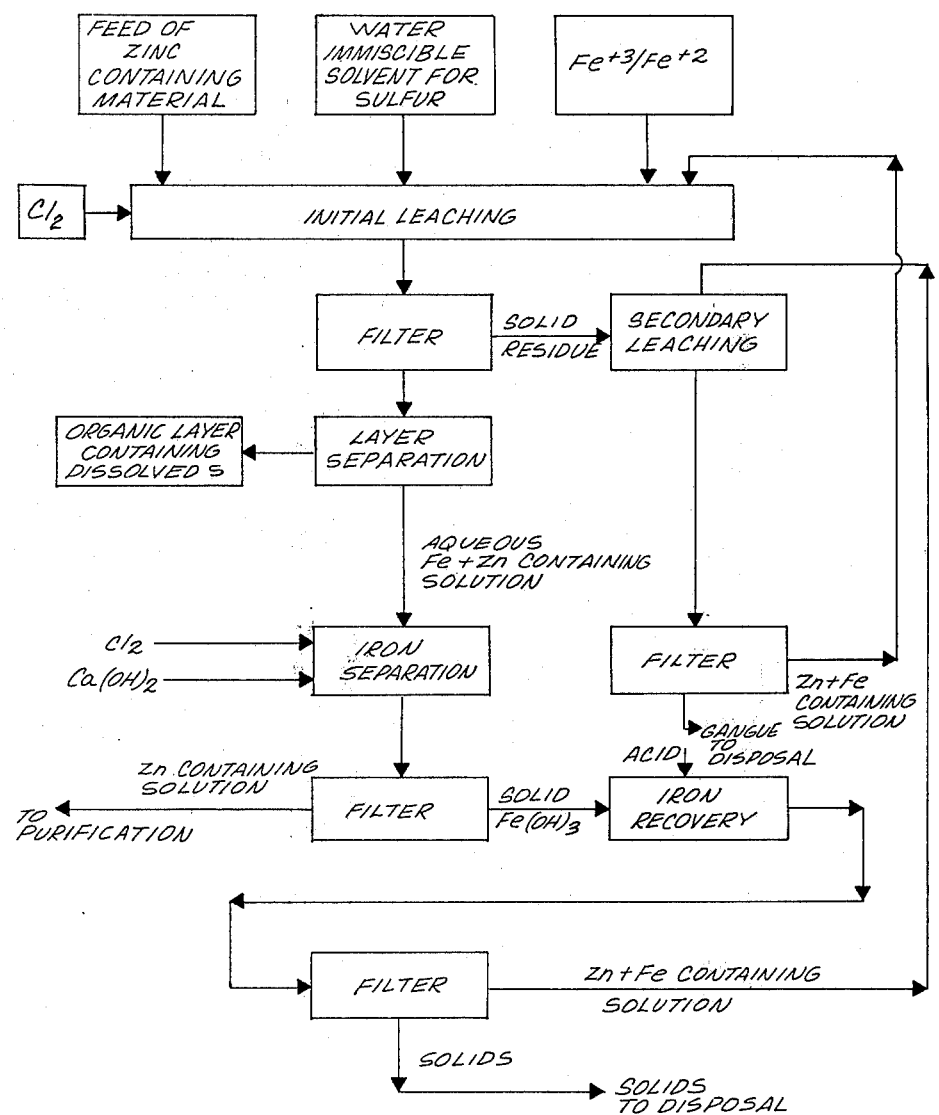

CHLORINATION LEACHING WITH SULFUR EXTRACTION FOR RECOVERY OF ZINC VALUES

CROSS REFERENCE TO RELATED APPLICATIONS

This application is a continuation-in-part of U.S. patent application Ser. No. 224,996 filed Jan. 14, 1981 now abandoned which is a division of U.S. Pat. application Ser. No. 32,662 filed Apr. 29, 1979 now abandoned which was a continuation-in-part of U.S. patent application Ser. No. 905,127, filed on May 12, 1978 (now abandoned). The entire disclosure but none of the prosecution history of these applications is hereby incorporated herein.

SUMMARY OF THE INVENTION

In accordance with this invention there is disclosed a process for recovering zinc values from a material containing zinc sulfide. The zinc sulfide-containing material is chlorinated in an aqueous medium at a temperature below the melting point of sulfur (i.e., below 118° C.) to form zinc chloride and elemental sulfur. The aqueous chlorinating solution contains soluble iron in a concentration including ferric and ferrous ions of less than about ten percent by weight of the total slurry of zinc sulfide material and aqueous chlorinating solution, or where a water-immiscible solvent for sulfur is used, less than about 10 percent by weight of the total slurry formed upon combining the zinc-sulfide containing material with the aqueous chlorination leaching solution and the water-immiscible solvent for sulfur. More preferably, the iron is no more than about 10 percent by weight of the aqueous chlorination leaching solution. The iron is preferably added as ferric chloride.

As used herein, the term "zinc values" refers to the recovery of either zinc metal or of a chemical compound of zinc which can, if desired, be converted to zinc metal.

A water-immiscible solvent (preferably inert) for the sulfur is added to the aqueous chlorinating solution, preferably during the chlorination process. The aqueous zinc-containing solution is separated from the immiscible solvent containing sulfur. The zinc values can be recovered from the aqueous layer, as by evaporation of the aqueous layer, crystallization of zinc compounds, ion-exchange collection of zinc ions, electrolysis to zinc metal or by reacting the aqueous solution with chemical agents to form other, desired, zinc compounds.

One use for the invention is to recover zinc values comprising an aqueous solution of zinc chloride which can be used as an electrolyte in an electrolytic cell for power production, as in a storage battery for an electrically powered automobile.

Further, there is disclosed in accordance with this invention, a process for the separation and recovery of zinc values from material containing zinc sulfide which includes partially chlorinating the zinc sulfide-containing material in an aqueous medium, followed by a secondary chlorination leaching recycle solution in the presence of elemental chlorine, ferric chloride and an immiscible solvent for sulfur to form an aqueous solution containing zinc chloride, iron chloride and partially chlorinated solid residue and a water immiscible solvent containing sulfur. The solid residue is separated from the liquid phases. The aqueous solution containing zinc ions is separated from the immiscible solvent containing sulfur. The aqueous layer is treated with an elemental chlorine and an alkali to precipitate the iron present as ferric hydroxide. The precipitated ferric hydroxide is separated from the aqueous solutions from which zinc values are recovered. The ferric hydroxide is redissolved in an acidic medium to form a secondary leaching solution. The secondary leaching solution is recycled to leach remaining zinc values from the initial solid residue to form a secondary chlorination leaching recycle solution containing leached zinc (i.e., zinc values). The secondary chlorination leaching solution containing leached zinc is recycled to an initial chlorination leaching step.

BRIEF DESCRIPTION OF THE DRAWINGS

FIG. 1 is a flow diagram of the process of the invention wherein a water-immiscible solvent is used to dissolve the elemental sulfur formed; and FIG. 2 is a flow diagram of the process of the invention wherein a secondary chlorinating solution is recycled.

DETAILED DESCRIPTION OF THE INVENTION

In order to facilitate the understanding of the present invention, reference will be made to the accompanying drawings which are flow diagrams of the process of this invention. FIG. 1 depicts an initial chlorine leaching step wherein a water-immiscible solvent for elemental sulfur is added to remove the sulfur formed during leaching. FIG. 2 depicts the process for recovery of zinc values wherein a secondary chlorinating solution is recycled. Following layer separation in FIG. 1, the solution containing dissolved compounds of Zn and Fe can be processed to recover iron therefrom for recycle in the manner as shown in FIG. 2.

The process of present invention can be used to recover zinc values from a zinc sulfide-containing material, such as a zinc ore or a float concentrate. The zinc-containing material, such as a zinc ore or float concentrate, is slurried in water. To the aqueous slurry is added ferric chloride in a concentration of less than about ten percent by weight of the slurry (or ferrous chloride) as a source of ferric or ferrous ions. The concentration of iron ions, both ferric and ferrous ions, is less than about ten percent by weight of the total slurry. The iron ions serve as a chlorine carrier. Additionally, chlorine gas is used to regenerate the ferric ion to react further with the zinc sulfide-containing ore or float concentrate. The overall reaction is best represented by the following equations:

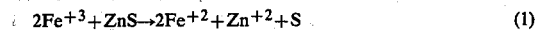

$$2Fe^{+3} + ZnS \rightarrow 2Fe^{+2} + Zn^{+2} + S \qquad (1)$$

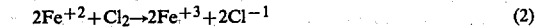

$$2Fe^{+2} + Cl_2 \rightarrow 2Fe^{+3} + 2Cl^{-1} \qquad (2)$$

$$ZnS + Cl_2 \rightarrow ZnCl_2 + S \qquad (3)$$

Equation (3) is the combination of equations (1) and (2) which indicates that zinc sulfide and chlorine gas are reactants and the products are zinc chloride and elemental sulfur. The iron acts as a transfer agent for the chlorine.

The regeneration of the ferric ions in the leaching solution by bubbling chlorine gas therethrough reduces the amount of ferric ions required to react with the zinc sulfide in the slurry. The amount of ferric ions required initially, therefore, is less than a stoichiometric amount in relation to the zinc sulfide present in the ore or concentrate. The concentration of ferric ions can vary, due to such regeneration, from about 5 g/l to substantially a molar stoichiometric amount to the sulfide sulfur present. It is preferred to use the minimum amount of ferric ions, i.e., less than ten percent by weight of the slurry, as any iron present in the slurry must be subsequently removed prior to the recovery of the zinc values. A preferred method of adding iron to the slurry is by adding a solution of an iron salt, such as an aqueous solution of ferric chloride to the slurry to provide the preferred less than ten percent by weight iron (ferric/ferrous) to the slurry. The stoichiometric equation for the reaction of the iron with sulfur is generally depicted by the following equation:

$$2Fe^{+3} + S^{-2} \rightarrow 2Fe^{+2} + S^O \qquad (4)$$

The source of the ferric ions can be any convenient iron-containing compound which is soluble in the slurry of ore or float concentrate such as soluble iron salts and the like. Preferably ferric chloride is selected, as such iron salts provides both iron and chloride ions.

The aqueous slurry of ore or float concentrate containing ferric ions is heated at about atmospheric pressure to a temperature of from about ambient to about the boiling point of the slurry which is less than 118° C., the melting of sulfur. Preferably, the slurry is heated to a temperature of from about 80° to about 110° C. As the aqueous slurry comprises a large proportion of water, the boiling point of the slurry is generally about 110° C. The slurry is agitated and chlorine is introduced beneath the surface of the slurry. The chlorine is introduced as chlorine gas which is bubbled through the slurry at a rate sufficient to oxidize the ferrous ions to ferric ions which ferric ions are concomitantly being reduced to ferrous ions by the sulfide sulfur in the ore or float concentrate (equation 4). The chlorine addition is terminated when from about 75 percent to about 90 percent of the zinc (i.e., the zinc in the zinc sulfide-containing material) present in the initial feed material has been extracted.

Prior to heating the aqueous slurry of ore or float concentrate a water immiscible solvent for sulfur can be added. The solvent dissolves the elemental sulfur as it is formed during the reaction of the zinc sulfide material with the ferric/ferrous ions. It has been found that sulfur formed during chlorination leaching tends to coat zinc sulfide material in the slurry. Thus, potential particles of zinc sulfide-containing material from which zinc values can be leached, are coated with a protective coating by the sulfur formed, making it difficult to recover zinc values from these particles. The efficiency of the chlorination leaching correspondingly decreases. By removing the sulfur as it is formed, there is provided substantially more reactive sites for the ferric ions than when sulfur is not removed and coats the surface of the ore particles. Further, removal of sulfur from the aqueous medium into the water-immiscible solvent reduces the formation of free acid which generally forms from a reaction of the sulfur and chlorine.

The water-immiscible solvent employed in the aqueous slurry to absorb and dissolve the sulfur formed can be any convenient solvent for sulfur that is compatible with the chlorination leaching process. Generally, such a solvent is an organic solvent that is stable toward the chlorine and the ferric/ferrous ions present. Preferred organic solvents are solvents which have a high affinity towards elemental sulfur and which have a sufficiently distinct density from water to facilitate good phase separation. The volume of solvent depends on the amount of sulfide sulfur in the slurry and the solubility of sulfur in the solvent. A volume is preferred that substantially absorbs and dissolves all of the sulfur generated during the chlorination leaching process. A particularly preferred solvent that is inert to substantially all the material present in the slurry, readily dissolves the sulfur formed and is easily separated from the aqueous slurry, is 1,1,2,2-tetrachloroethane.

The water-immiscible solvent is added to the aqueous slurry containing the zinc sulfide ore or float concentrate. A source of ferric iron ions is also added and the aqueous slurry is heated from about ambient temperature to about the boiling point of the slurry as described hereinabove. Chlorine gas is introduced into the slurry from below at a rate sufficient to oxidize the ferrous ions to ferric ions which are being reduced to ferrous ions by the sulfide sulfur in the ore.

Following the addition of the chlorine gas to the slurry, the resulting mass is filtered and the solid residue separated from the liquid phase. The residue substantially contains some unreacted zinc sulfide material, insoluble minerals in the ore and other insoluble matter. As a water-immiscible solvent for sulfur is employed, the residue does not contain any appreciable amount of sulfur. The filtrate from the reaction residue is allowed to separate into an aqueous and organic layer. The two layers are separated. The organic layer contains dissolved sulfur formed during the reaction. The aqueous layer, containing zinc values, ferric/ferrous and chloride ions, is processed to recover the zinc in the same manner as if such a water-immiscible solvent had not been employed. The aqueous solution containing the leached zinc also contains dissolved ferric/ferrous ions. It is, therefore, advantageous to remove the iron from the solution and recycle it for use in an additional zinc leaching step upon either a solid residue generated in the initial chlorination leaching step (FIG. 2) or a new untreated ore or float concentrate (not shown). The removal of the iron also enhances the recoverability of zinc values. The iron is removed from the solution by treating the solution with an alkali to provide pH of about 3 to 4 and precipitating the iron as ferric hydroxide which is separated by any convenient manner, such as by filtration. A preferred alkali used to precipitate the iron is calcium hydroxide. The recovered alkaline solution containing zinc values can be treated to recover the zinc therefrom by any convenient method. Many such methods for recovering zinc from solution are known to those skilled in the art, such as by electrolysis.

The precipitated ferric hydroxide can be dissolved in aqueous acid, such as hydrochloric acid, sulfuric acid, nitric acid and the like to form a secondary chlorinating solution. Hydrochloric acid is preferred over nitric acid or sulfuric acid because nitrate or sulfate ions could interfere with a later electrolysis step and, therefore, would have to be removed.

With reference to FIG. 2, after dissolving the iron in an aqueous acid solution to form a secondary leaching solution, the solution is filtered for removing any undissolved solids. The resulting solution is recycled as a secondary leaching solution to leach additional zinc values from the solid residue remaining and recovered from an initial leaching step.

Generally, the solid residue from an initial leaching step would be discarded as containing non-recoverable zinc values. However, the method herein allows for leaching such zinc values from the solid residue by using the acidic iron-containing secondary leaching solution.

If an acid other than hydrochloric acid is used to dissolve the iron when forming the secondary leaching solution, then chlorine can be bubbled through the slurry of solid residue and secondary leaching solution during such secondary leaching. If hydrochloric acid is utilized, there is no need for the use of additional chlorine although it can be used.

Following the secondary chlorination leaching of the solid residue the mixture is filtered. The solid material remaining is gangue, containing substantially sulfur and other insoluble material. The solution recovered containing zinc values and iron is recycled and added to an aqueous slurry feed of zinc sulfide ore or float concentrate in an initial chlorination leaching step. Such iron in the recycle solution can be considered when determining the amount of iron to add to the initial leaching step.

The invention is further illustrated by the following examples which are not intended to be limiting.

EXAMPLE I

An aqueous slurry was prepared by combining 150 parts by weight (pbw) of a ten percent by weight aqueous, ferric chloride solution, 160 pbw of 1,1,2,2-tetrachloroethane and 100 pbw of a float concentrate containing zinc sulfide. The resulting amount of iron was about 3.7 percent by weight of the total slurry. The temperature of the slurry was maintained at 60° C. at about atmospheric pressure. Chlorine gas was introduced from below the slurry at a rate of about 0.6 of one part by weight per minute for about 100 minutes. The total amount of chlorine added was about 60 pbw. Following chlorination leaching the resulting mass was filtered and washed. The filtrate was placed into a separatory funnel and the layers were allowed to separate. The organic layer was separated from the aqueous layer. The total aqueous layer consisting of the combined filtrate and wash contained 47.5 pbw (parts by weight) zinc (in the form of dissolved zinc values). The organic layer contained substantially all of the sulfide.

The zinc was recovered from the aqueous solution by electrolysis. The amount of zinc recovered was 61 percent of the initial zinc present in the float concentrate.

EXAMPLE II

An aqueous slurry is prepared by combining 200 pbw of a 12 percent by weight aqueous solution of ferric chloride and 170 pbw of 1,1,2,2-tetrachloroethane at 90° C. with 100 pbw of a float concentrate containing about 54 percent by weight zinc (in the form of zinc compounds). The resulting amount of iron is about 5.2 percent by weight of the slurry. The temperature of the slurry is maintained at 90° C. at atmospheric pressure by using a heating mantle controlled by a thermistor. A mechanical stirrer is used to agitate the slurry at about 650 rpms. Chlorine gas is introduced beneath the surface of the slurry at a rate of about 0.3 of one part of weight per minute for a period of about 200 minutes. The total amount of chlorine added is about 60 pbw. At the end of the addition of chlorine gas the resulting mass is filtered while still hot. The solid residue obtained thereby is washed with 100 pbw water.

The recovered filtrate consisting of two liquid phases contains zinc ions, chloride ions, and ferric/ferrous ions. The filtrate is placed into a separatory funnel and allowed to separate into two liquid phases. The organic layer is separated and discarded as containing substantially all the sulfur. The aqueous layer containing zinc ions and iron ions is further treated for removal of the iron.

The ferrous ions present in the aqueous solution are converted to ferric ions by the chlorine. The ferric ions in the filtrate are precipitated out of solution as ferric hydroxide by the addition of calcium hydroxide. The resulting mixture is filtered and the solid ferric hydroxide is separated from the zinc-containing solution. Hydrochloric acid is added to the ferric hydroxide to redissolve the ferric hydroxide. The resulting solution containing ferric ions is recycled and combined with the solid residue and the partially reacted ore or float concentrate of the initial chlorination leaching step. The ferric ion-containing solution acts as a secondary leaching solution and leaches additional zinc values from the solid residue and partially reacted ore. Following chlorination the mixture is filtered. The solid material is discarded as gangue, the filtrate containing zinc ions and ferric/ferrous ions is recycled to an initial chlorination leaching step on an untreated zinc sulfide-containing ore or float concentrate.

What is claimed is:

1. A process for recovering zinc values from zinc sulfide-containing material, comprising the steps of:
   (a) partially chlorinating zinc sulfide-containing material in an aqueous medium including recycle solution from step (i) and an aqueous chlorination leaching solution containing elemental chlorine and ferric chloride, in the presence of a water immiscible solvent for sulfur at a temperature below the melting point of sulfur and at about atmospheric pressure, to form an aqueous layer containing zinc chloride, iron, chlorine and partially chlorinated solid residue and a water-immiscible solvent layer containing sulfur;
   (b) separating the aqueous layer and water-immiscible solvent layer from the solid residue,
   (c) separating the aqueous layer containing zinc chloride, iron and chlorine from the immiscible solvent layer containing sulfur;
   (d) treating the separated aqueous layer with elemental chlorine and an alkali to precipitate ferric hydroxide;
   (e) separating precipitated ferric hydroxide from the aqueous layer;
   (f) recovering zinc values from the aqueous layer;
   (g) dissolving the precipitated ferric hydroxide in an acidic medium to form a secondary leaching solution;
   (h) leaching additional zinc values from the solid residue with the secondary leaching solution in the presence of chlorine to form a recycle solution containing zinc chloride and iron chloride; and
   (i) returning the recycle solution to step (a).

2. A process as recited in claim 1 wherein the water-immiscible solvent for sulfur is 1,1,2,2-tetrachloroethane.

3. A process as recited in claim 1 wherein the temperature is from about 80° C. to about 110° C.

4. A process as recited in claim 1 wherein the amount of iron in the partially chlorinating step, provided by ferric chloride and recycle solution, is less than about ten percent by weight of the slurry formed by the zinc sulfide-containing material, recycle solution, aqueous chlorination leaching solution and water-immiscible solvent for sulfur.

5. A process for recovering zinc values from zinc sulfide-containing material, comprising the steps of:

(a) partially chlorinating zinc sulfide-containing material in an aqueous medium including recycle solution from step (i) and an aqueous chlorination leaching solution containing elemental chlorine and ferric chloride in the presence of 1,1,2,2-tetrachloroethane, at about atmospheric pressure, at a temperature in the range of 80° to about 110° C. and below the melting point of sulfur, to form an aqueous layer containing zinc chloride, iron, chlorine and partially chlorinated solid residue and a water-immiscible solvent layer containing sulfur; and wherein the amount of iron provided by said ferric chloride and said recycle solution is less than about ten percent by weight of the slurry formed by the zinc sulfide-containing material, recycle solution, aqueous chlorination leaching solution and water-immiscible solvent for sulfur;

(b) separating the aqueous layer and water-immiscible solvent layer from the solid residue;

(c) separating the aqueous layer containing zinc chloride, iron and chlorine from the immiscible solvent layer containing sulfur;

(d) treating the separated aqueous layer with elemental chlorine and an alkali to precipitate ferric hydroxide;

(e) separating precipitated ferric hydroxide from the aqueous layer;

(f) recovering zinc values from the aqueous layer;

(g) dissolving the precipitated ferric hydroxide in an acidic medium to form a secondary leaching solution;

(h) leaching additional zinc values from the solid residue with the secondary leaching solution in the presence of chlorine to form a recycle solution containing zinc chloride and iron chloride; and (i) returning the recycle solution to step (a).

* * * * *